(12) United States Patent
An

(10) Patent No.: US 7,230,660 B2
(45) Date of Patent: Jun. 12, 2007

(54) LIQUID CRYSTAL DISPLAY DEVICE

(75) Inventor: Su Young An, Chungcheongnam-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 52 days.

(21) Appl. No.: 10/682,877

(22) Filed: Oct. 14, 2003

(65) Prior Publication Data
US 2004/0125268 A1 Jul. 1, 2004

(30) Foreign Application Priority Data
Dec. 31, 2002 (KR) ........................ 10-2002-0087791

(51) Int. Cl.
G02F 1/1333 (2006.01)
(52) U.S. Cl. ....................................................... 349/58
(58) Field of Classification Search ............. 349/58–60
See application file for complete search history.

(56) References Cited
U.S. PATENT DOCUMENTS 5,383,318 A * 1/1995 Kelley et al. ............... 52/287.1
6,101,819 A * 8/2000 Onaka et al. ................. 62/125
6,292,239 B1 * 9/2001 Nagamura et al. ............ 349/58
2005/0083449 A1 * 4/2005 Morsch ........................ 349/58

FOREIGN PATENT DOCUMENTS

JP 2001-117094 4/2001

* cited by examiner

Primary Examiner—Dung T. Nguyen
(74) Attorney, Agent, or Firm—McKenna Long & Aldridge LLP

(57) ABSTRACT

A liquid crystal display (LCD) device includes a structure for fixing a wire from a backlight. The LCD device includes a liquid crystal module (LCM) having an LCD panel for displaying images and a backlight for uniformly irradiating light to the LCD panel; a wire connected to and extending from the backlight; a main support arranged below the LCM; a first rib arranged at one side of the main support; a through-hole arranged within the main support adjacent the first rib; a guide panel for supporting the LCD panel; and a second rib arranged on the guide panel in correspondence with the through-hole on the main support.

38 Claims, 5 Drawing Sheets

LIQUID CRYSTAL DISPLAY DEVICE

This application claims the benefit of the Korean Application No. 10-2002-87791 filed on Dec. 31, 2002, which is hereby incorporated by reference for all purposes as if fully set forth herein.

BACKGROUND OF THE INVENTION

1. Field of the Invention

The present invention relates to liquid crystal display (LCD) devices, and more particularly, to structures for securely fixing wires of backlights used in LCD devices.

2. Discussion of the Related Art

Due to recent developments of the information society, demand for various types of display devices continue to increase. Accordingly, various flat panel display devices such as liquid crystal displays (LCDs), plasma display panels (PDPs), electro-luminescent displays (ELDs), vacuum fluorescent displays (VFDs), and the like, have been developed and are currently used in various information devices.

Due to their thin profile, low weight, and low power consumption characteristics, LCDs are widely used as substitutes for Cathode Ray Tubes (CRTs) and are commonly employed as displays in notebook computers, computer monitors, and televisions.

Typically, LCD devices include an LCD panel for displaying images and a driving part for applying driving signals to the LCD panel. LCD panels generally include first and second glass substrates bonded to each other and spaced apart from one another by a predetermined distance wherein a layer of liquid crystal material is injected between the bonded first and second glass substrates.

The first glass substrate (i.e., the TFT array substrate) generally supports a plurality of gate lines spaced apart from one another by a predetermined distance and extending along a first direction; a plurality of data lines spaced apart from one another by a predetermined distance and extending along a second direction, substantially perpendicular to the first direction to cross the plurality of gate lines; a plurality of pixel electrodes arranged in a matrix pattern and formed in pixel regions defined by crossings of the plurality of gate and data lines; and a plurality of thin film transistors (TFTs) for transmitting signals applied from the plurality of data lines to respective ones of the plurality of pixel electrodes in response to signals applied from the plurality of gate lines.

The second glass substrate (i.e., the color filter substrate) generally supports a black matrix layer for preventing light from being transmitted by the LCD panel in regions outside the pixel regions; a red/green/blue (R/G/B) color filter layer for selectively transmitting light of predetermined wavelengths (i.e., for displaying color); and a common electrode for generating images. In-Plane Switching (IPS) mode LCD devices include a unique type of LCD panel wherein the common electrode is formed on the first glass substrate instead of the second glass substrate.

The predetermined distance by which the first and second glass substrates are spaced apart from each other (i.e., the cell gap) is uniformly maintained by spacers. Moreover, the first and second substrates are bonded to each other using a seal pattern having a liquid crystal injection hole. After the first and second glass substrates are bonded to each other, liquid crystal material is injected through the liquid crystal injection hole and into the cell gap to form the layer of liquid crystal material.

LCD panels do not emit light by themselves. Rather, LCD panels control the degree to which light supplied by an external light source is transmitted to display images. Typically, light can be uniformly supplied by external light sources such as backlights. Examples of backlights currently used with LCD devices include Electro-Luminescence (EL) cells, Light Emitting Diodes (LEDs), Cold Cathode Fluorescent Lamps (CCFLs), and Hot Cathode Fluorescent Lamps (HCFLs). Due to their long lifetime, low power consumption characteristics, and thin profile, CCFLs are commonly used as backlights for LCD devices such as large-sized color TFT-LCD devices.

FIG. 1 illustrates an exploded perspective view of a related art liquid crystal module (LCM) of a LCD device.

Referring to FIG. 1, related art LCMs generally include a backlight unit 12 and an LCD panel 11 arranged between a main support 13, formed of a plastic material, and a top case 20, formed of a metal material. Generally, a guide panel 14, components of the backlight unit 12 (e.g., a reflecting plate 12a, a light-guiding plate 12b, a first diffusing or protecting sheet 12c, a first prism sheet 12d, a second prism sheet 12e, and a second diffusing or protecting sheet 12f), a lower polarizing plate 11b, the LCD panel 11, and an upper polarizing plate 11a, are sequentially stacked on the main support 13.

Backlights may be classified as direct-type or edge-type depending on their location relative to the LCD panel and the manner in which the light they supply is directed to the LCD panel. For example, direct-type backlights irradiate light directly to a lower side of the LCD panel. Edge-type backlights, however, are arranged in side portions of the main support 13 and irradiate light to the light-guiding plate 12b, wherein light incident the light-guiding plate 12b subsequently becomes uniformly distributed and transmitted to the lower side of the LCD panel 11.

As mentioned above, Cold Cathode Fluorescent Lamps (CCFLs) are commonly used as backlights within LCM. Accordingly, a CCFL used within LCD devices is usually coupled to an inverter mounted on a rear of the LCM 10 by wires extending from a side or rear portion of the LCM 10. Typically, the wires are often soldered to a power source connector part of the CCFL. The inverter converts externally provided Direct Current (DC) electricity into Alternating Current (AC) electricity, wherein the AC electricity is used by the CCFL to emit light.

While assembling the LCM 10 and the LCD device, the wires connecting the CCFL to the inverter may become dislodged or twisted. As a result, the wires may become separated, damaged, or disconnected from the CCFL. To prevent the wires from becoming damaged or otherwise disconnected, wire fixing structures must be incorporated within the LCM 10.

FIG. 2 illustrates a cross-sectional view of a related art wire fixing structure within the LCM shown in FIG. 1.

Referring to FIG. 2, the LCD panel 11 is supported by an upper side of the guide panel 14 while the main support 13 and the light-guiding plate 12b are arranged beneath a lower side of the guide panel 14. Further, a hook 30 extends from the main support 13, is formed in a "⊏" type shape at one side of the main support 13, and receives a wire 25 connected to a Cold Cathode Fluorescent Lamp (CCFL) (not shown) of the backlight unit 12. Once the wire 25 is inserted into the hook 30, a pad 31 must be inserted into a space between the end of the hook 30 and a side portion of the main support 13 to prevent the wires 25 from being separated and/or removed from an opening of the hook 30 during LCM and LCD device fabrication (e.g., during transferring processes).

The pad 31 is formed of an elastic material, such as sponge, to facilitate its insertion into the space between the side portion of the main support 13 and the end of the hook 30. Accordingly, the related art wire fixing structure includes the hook 30, provided in the shape of a "⊏" and extending from the main support 13, as well as the elastic pad 31, provided to close the opening of the hook 30.

Use of the aforementioned related art wire fixing structure, however, is disadvantageous because additional components, such as the pad 31, are required. Attendant with the insertion of the pad 31, manual processes required to insert the pad 31 into the space between the side portion of the main support 13 and the end of the hook 30, and the like, must undesirably be performed, thereby increasing manufacturing cost of the LCD device, and lowering the yield of the process itself. Furthermore, since the pad 31 is formed of elastic material such as a sponge, the pad 31 is easily deformable, facilitating accidental movement of the wires 25 into the space between the hook 30 and the main support 13. Moreover, when the LCM is shaken, the pad 31 can even be removed from the space between the side portion of the main support 13 and the end of the hook 30, thereby enabling the wires 25 to be completely removed from the hook, damaged, and disconnected from the CCFL. Lastly, because the pad 31 is formed of elastic material, such as a sponge, foreign materials such as dust particles are generated and can statically adhere to the screen of the LCM device, thereby deteriorating a picture quality of the resultant LCD device.

SUMMARY OF THE INVENTION

Accordingly, the present invention is directed to a liquid crystal display (LCD) device that substantially obviates one or more problems due to limitations and disadvantages of the related art.

An advantage of the present invention provides an LCD device having a structure for fixing wires of a backlight and for improving a production yield of the process of manufacturing the LCD device.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an LCD device may, for example, include a liquid crystal module (LCM), wherein the LCM may include an LCD panel for displaying an image and a backlight for substantially uniformly irradiating light to the LCD panel; at least one wire extending from, and connected to the backlight; a main support arranged below the LCD panel, wherein the main support includes a first rib and a through-hole adjacent the first rib; a guide panel for supporting the LCD panel; and a second rib arranged on the guide panel in correspondence with the arrangement of the through-hole in the main support.

In one aspect of the present invention, the first rib may project from a surface of the main support.

In another aspect of the present invention, the second rib may extend through the through-hole.

In still another aspect of the present invention, the second rib may project from a surface of the guide panel.

In yet another aspect of the present invention, first and second hooks having a shape of, for example, "]" and "[", respectively, may be formed at respective ends of the first and second ribs, respectively.

In still a further aspect of the present invention, the first and second hooks may be oppositely configured and arranged adjacent to each other.

In yet a further aspect of the present invention, exterior adjacent corners of the first and second hooks may be beveled to facilitate the insertion of a wire into a space between the first and second ribs.

In still a further aspect of the present invention, the wire is insertable within a space between the first and second ribs and is fixable within the space between the first and second ribs by the first and second hooks.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
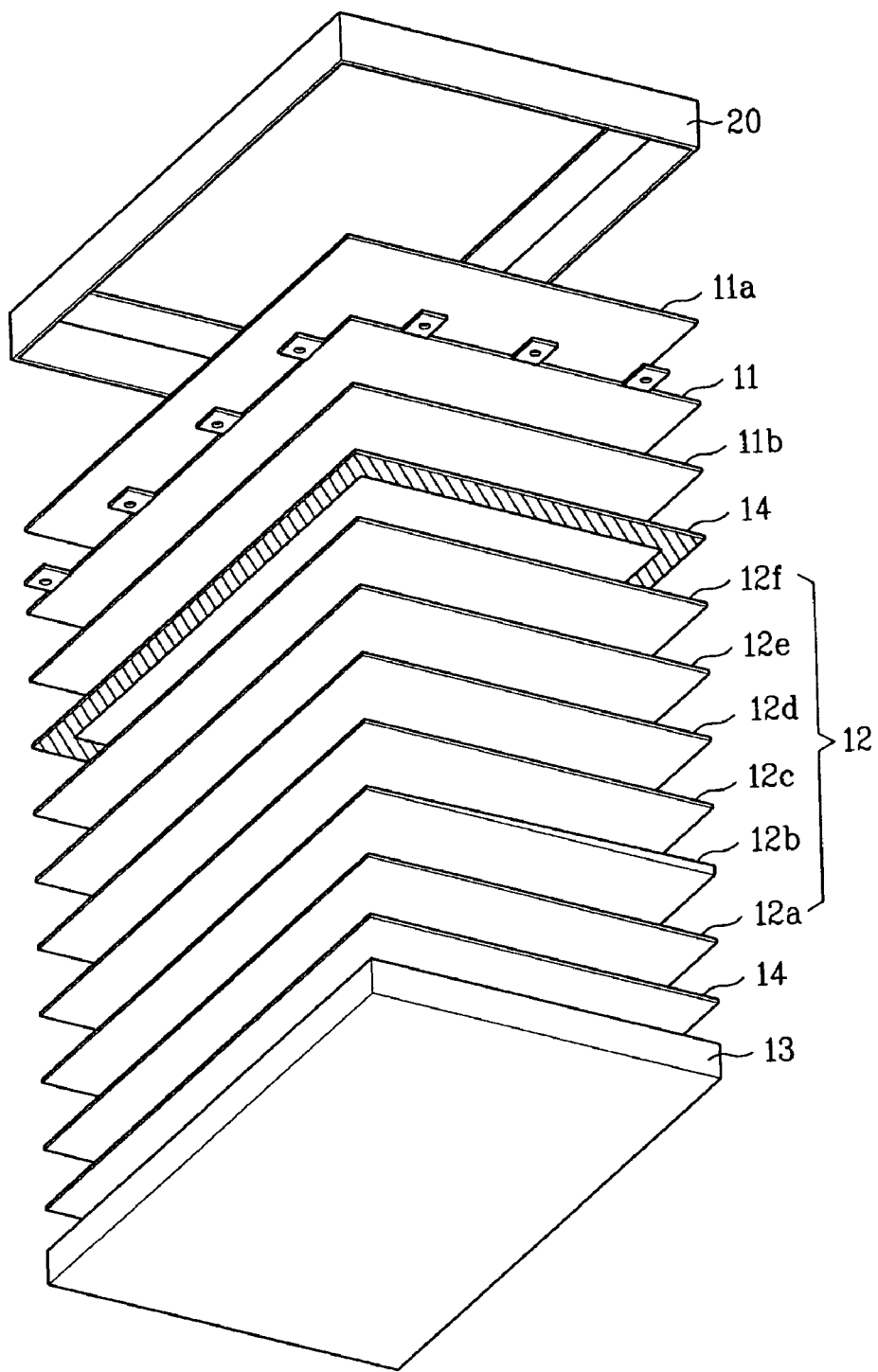
FIG. 1 illustrates an exploded perspective view of a related art liquid crystal module (LCM) in a liquid crystal display (LCD) device.
Figure 2:
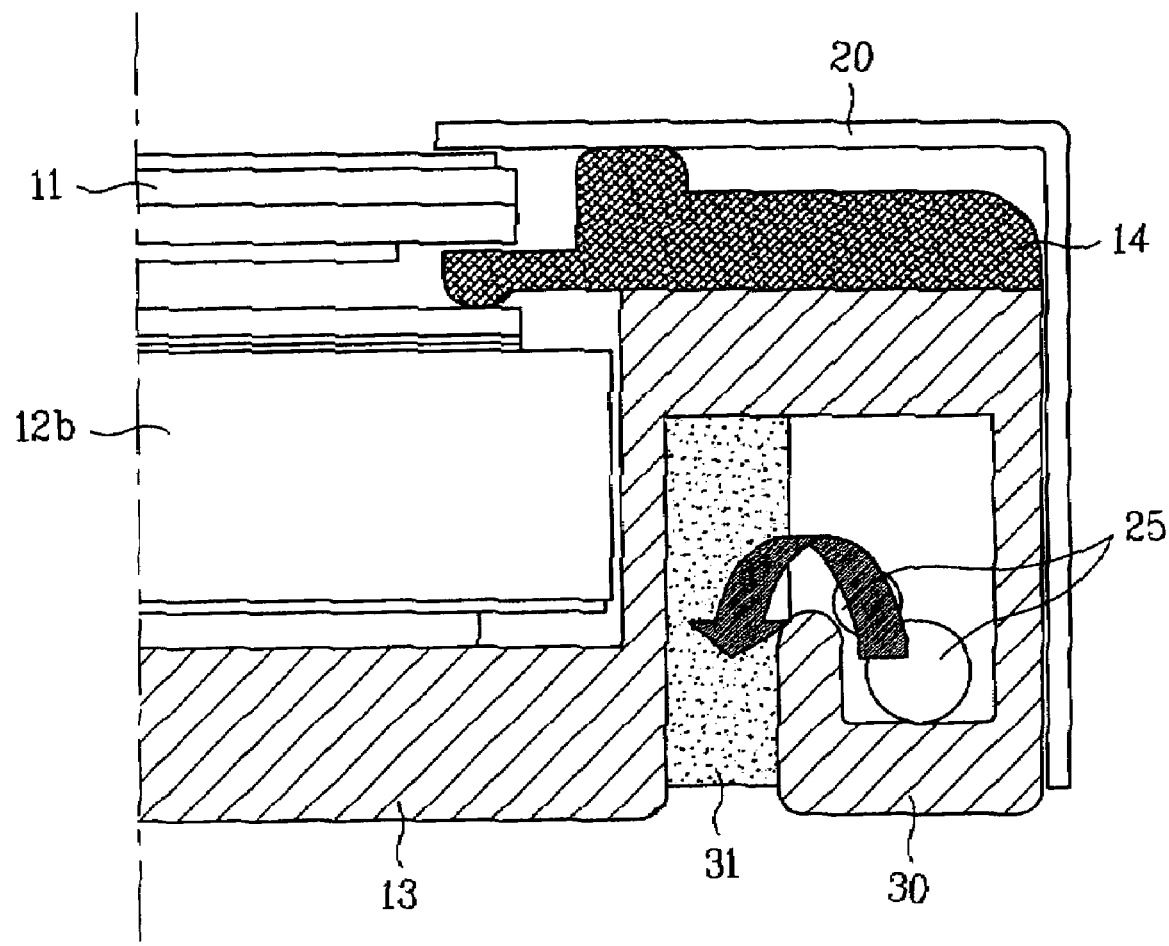
FIG. 2 illustrates a cross-sectional view of a related art wire fixing structure of the LCM shown in FIG. 1.
Figure 3:
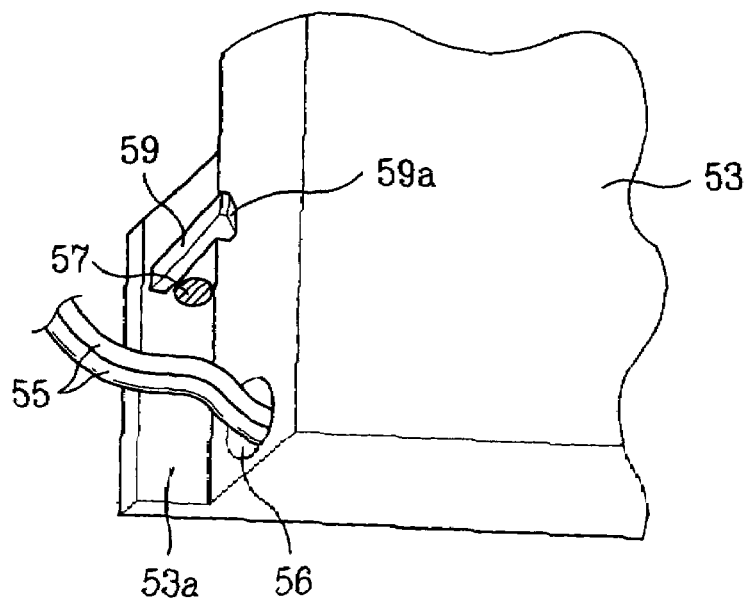
FIG. 3 illustrates a rear perspective view of a main support according to principles of the present invention.

FIG. 3 illustrates a rear perspective view of a main support according to principles of the present invention.

Referring to FIG. 3, a wire hole 56 may be provided within one side of a main support 53 such that a wire 55, connected to a backlight (not shown), may extend through the wire hole 56. In one aspect of the present invention, the backlight may, for example, include a CCFL-type light source, or the like.

The main support 53 may further include a first extending surface 53a adjacent the wire hole 56 and a first rib 59 arranged on the first extending surface 53a. The first rib 59 may project from the first extending surface 53a by a predetermined distance. Moreover, a first hook 59a may be arranged at an end of the first rib 59. In one aspect of the present invention, the first rib 59 may project from the first extending surface 53a to a predetermined distance such that the first hook 59a is substantially level with a rear side of the main support 53. As will be discussed in greater detail below, the first hook 59a may be provided in a formed in a "]" shape, or the like, for fixing a wire 55. In one aspect of the present invention, the main support 53, the first extending surface 53a, the first rib 59, and the first hook 59a may be integrally formed as a unitary body. In another aspect of the present invention, the main support 53 may be formed from a material such as plastic. According to the principles of the present invention, a through-hole 57 may be formed within the main support 53 and adjacent a side portion of the first rib 59.

Figure 4:
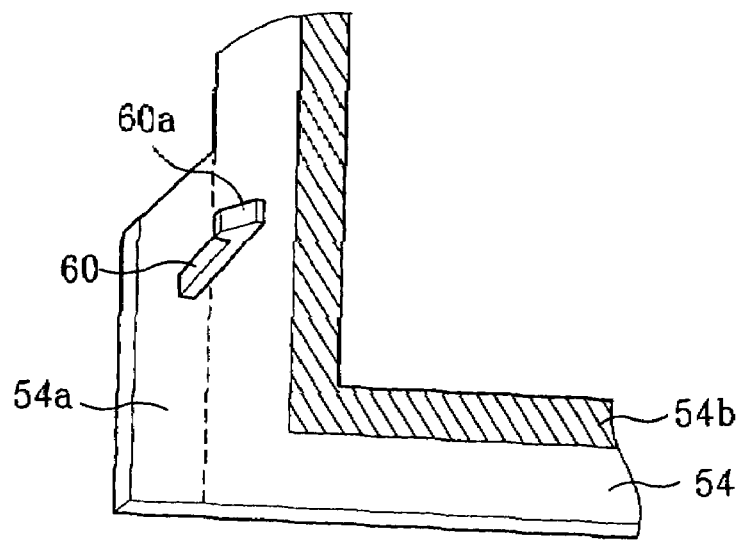
FIG. 4 illustrates a rear perspective view of a guide panel according to principles of the present invention.

FIG. 4 illustrates a rear perspective view of a guide panel according to principles of the present invention.

Referring to FIG. 4, a guide panel 54 may include a second extending surface 54a having dimensions substantially conformal to dimensions of the first extending surface 53a. According to the principles of the present invention, the guide panel 54 may be formed along an edge of the main support 53. Moreover, the periphery of the guide panel 54 may define an area substantially equal to an area defined by the periphery of the main support 53. As will be discussed in greater detail below, an interior edge of the guide panel 54 may include a loading surface 54b for supporting an LCD panel (not shown). In one aspect of the present invention, a portion of light emitted from the backlight may be intercepted by a rectangular interior surface of the loading surface 54b.

The guide panel 54 may further include a second rib 60 arranged on the second extending surface 54a in substantial correspondence with the arrangement of the through-hole 57 of the main support 53. In one aspect of the present invention, the second rib 60 may extend through the through-hole 57 and project from the second extending surface 54a by a predetermined distance. Moreover, a second hook 60a may be arranged at an end of the second rib 60. In one aspect of the present invention, the second rib 60 may project from the second extending surface and extend through the through-hole 57 such that the second hook 60a is substantially level with the rear side of the main support 53. As will be discussed in greater detail below, the second hook 60a may be formed in a "[" shape, or the like, for fixing the wire 55. In one aspect of the present invention, the guide panel 54, the second extending surface 54a, the second rib 60, and the second hook 60a may be integrally formed as a unitary body. In another aspect of the present invention, the guide panel 54 may be formed from a material such as plastic.

Figure 5:
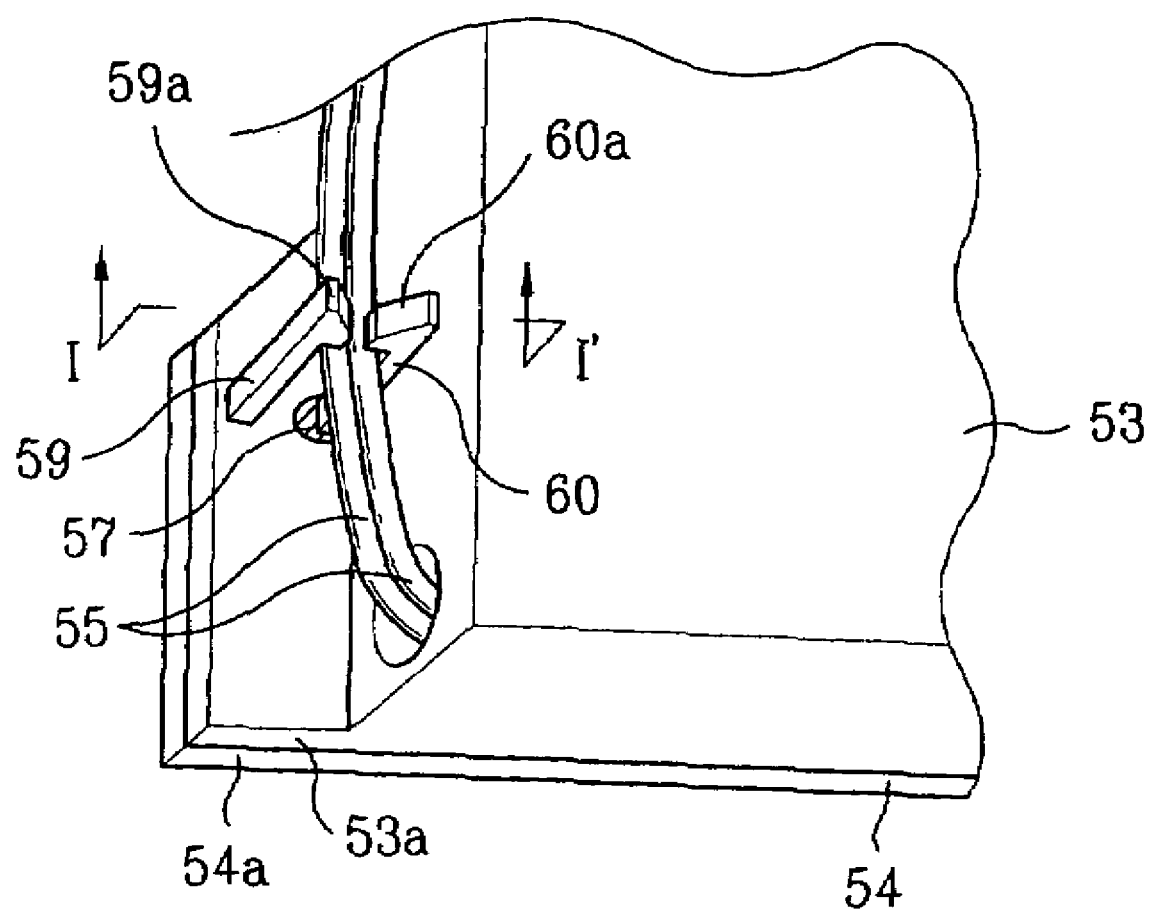
FIG. 5 illustrates a rear perspective view of a wire fixing structure according to principles of the present invention.

FIG. 5 illustrates a rear perspective view of a wire fixing structure according to principles of the present invention.

Referring to FIG. 5, the first and second hooks 59a and 60a may be oppositely configured and may be arranged adjacent each other. The second rib 60 may extend through the through-hole 57 formed within the extending surface 53a of the main support 53 and project from the second extending surface 54a by a predetermined distance such that the second hook 60a is substantially level with the rear side of the main support 53.

In one aspect of the present invention, the first and second ribs 59 and 60 may be arranged adjacent each other such that end portions of the first and second hooks 59a and 60a may be arranged adjacent each other. In another aspect of the present invention, end portions of the first and second hooks 59a and 60a may be spaced apart by a predetermined distance, wherein the predetermined distance is less than the cross-sectional thickness of the wire 55 of the backlight (not shown). In still another aspect of the present invention, the first and second ribs 59 and 60 may project from their respective first and extending surfaces 53a and 54a by a predetermined distance such that the wire 55 may be suitably inserted into and fixed within the space between the first and second ribs 59a and 60a.

Figure 6:
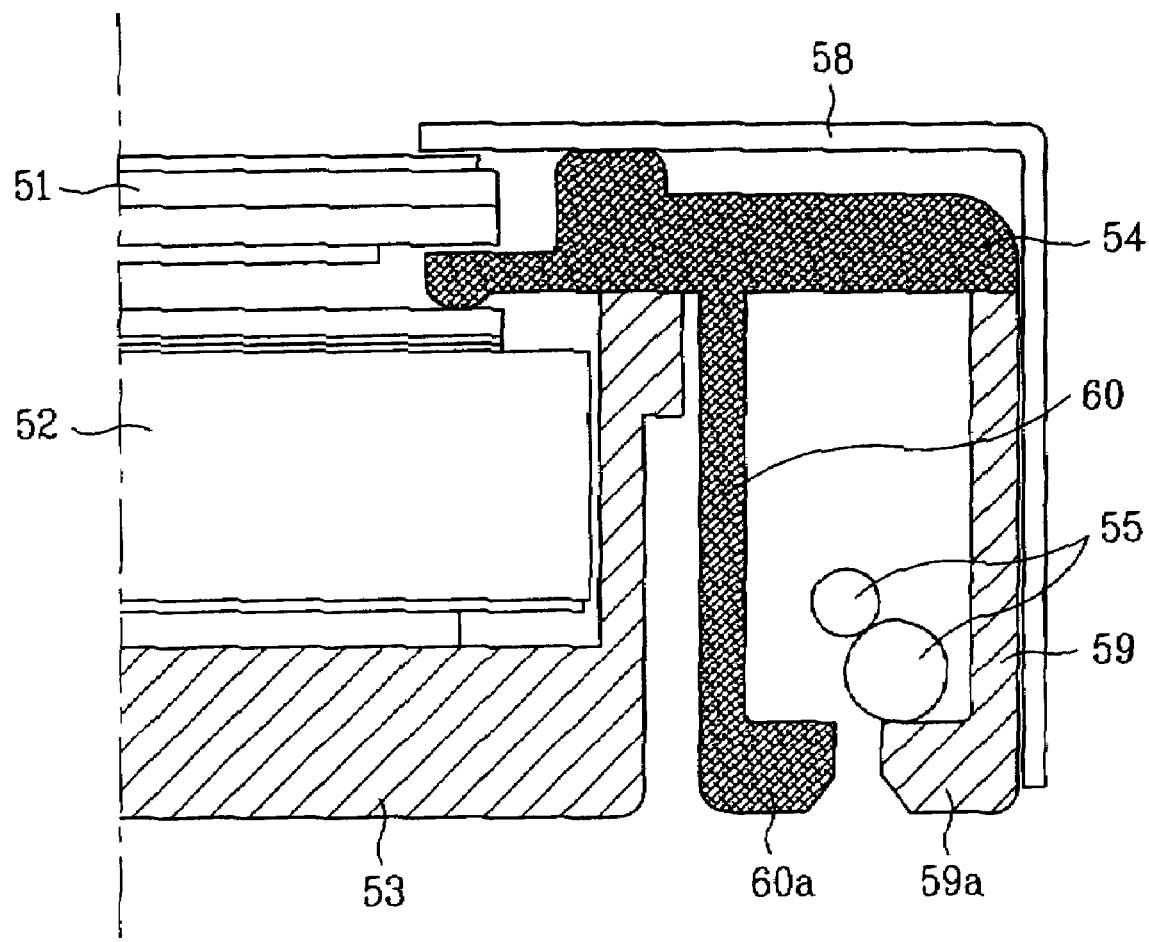
FIG. 6 illustrates a cross-sectional view of an LCM taken along line I–I' as shown in FIG. 5.

FIG. 6 illustrates a cross-sectional view taken along line I–I' as shown in FIG. 5.

Referring to FIG. 6, an LCD panel 51 may be provided for displaying images and a backlight 52 may be provided to substantially uniformly irradiate light to the LCD panel 51. In one aspect of the present invention, the backlight 52 may be connected to a top case 58 formed of a material such as metal and fixed to an upper side of the LCD panel 51. Moreover, the LCD panel 51 may be supported by the guide panel 54 which, in turn, is supported by the main support 53. In another aspect of the present invention, the second rib 60 may be arranged on a portion of the guide panel 54 adjacent a side of the LCD panel 51 and the backlight unit 52 wherein the second rib 60 may extend through the through-hole 57 of the main support 53 and project a predetermined distance from the aforementioned second extending surface 54a. Upon extending through the through-hole 57, the first rib 59 of the main support 53 is oppositely configured and arranged adjacent to the second rib 60.

As described above, the first and second hooks 59a and 60a, having shapes such as "]" and "[", respectively, may be formed at respective ends of the first and second ribs 59 and 60, respectively. In one aspect of the present invention, the first and second hooks 59a and 60a may be oppositely configured and arranged adjacent each other such that end portions of the first and second hooks 59a and 60a are spaced apart by a predetermined distance less than a cross-sectional thickness of the wire 55, wherein the wire 55 connected to a light source (not shown). In one aspect of the present invention, the wire 55 is insertable between the end portions of the first and second hooks 59a and 60a. In another aspect of the present invention, exterior adjacent corners of the first and second hooks 59a and 60a may be beveled to facilitate insertion of the wire 55 into the space between the first and second ribs 59 and 60.

Further, and as previously described above, the first and second ribs 59 and 60 may be formed from a material such as plastic. Accordingly, when the wire 55 is inserted between the end portions of the first and second hooks 59a and 60a, the first and second ribs 59 and 60 may be elastically deflected away from one another, allowing the wire 55 to be arranged between the first and second ribs 59 and 60. Further, after the wire 55 is inserted between the end portions of the first and second hooks 59a and 60a, the first and second ribs 59 and 60 may become elastically restored to their original positions, allowing the wire 55 to be securely fixed within the space between the first and second ribs 59 and 60 by the first and second hooks 59a and 60a. Accordingly, the principles of the present invention may be applied to substantially prevent the wire 55 from being separated, damaged, or disconnected from a light source of a backlight unit.

Use of an LCD device incorporating the wire fixing structure of the present invention is advantageous because wire 55 may be easily inserted and securely fixed between first and second ribs without any additional components, thereby decreasing manufacturing cost and improving production yield. Because no additional components (e.g., pads) are required, the generation of foreign materials may be substantially eliminated.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
   a liquid crystal module (LCM), the LCM including an LCD panel and a backlight;
   a wire connected to the backlight;
   a main support arranged below the LCD panel, the main support including a first rib and a through-hole adjacent the first rib;
   a guide panel for supporting the LCD panel; and
   a second rib arranged on the guide panel in correspondence with the arrangement of the through-hole within the main support.

2. The LCD device of claim 1, wherein the first rib projects from a surface of the main support.

3. The LCD device of claim 1, wherein the second rib extends through the through-hole.

4. The LCD device of claim 1, wherein the second rib projects from a surface of the guide panel to a lower surface of the main support.

5. The LCD device of claim 1, further comprising a first hook formed at an end of the first rib.

6. The LCD device of claim 5, wherein first hook has a shape of "J".

7. The LCD device of claim 1, further comprising a second hook formed at an end of the second rib.

8. The LCD device of claim 7, wherein the second hook has a shape of "L".

9. The LCD device of claim 1, further comprising first and second hooks formed at ends of the first and second ribs, respectively.

10. The LCD device of claim 9, wherein the first and second hooks are oppositely configured.

11. The LCD device of claim 9, wherein the first and second hooks are arranged adjacent each other.

12. The LCD device of claim 9, wherein exterior adjacent corners of the first and second hooks are beveled.

13. The LCD device of claim 12, wherein the exterior adjacent corners of the first and second hooks are beveled towards each other.

14. The LCD device of claim 12, wherein the wire is insertable into a space between the first and second ribs.

15. The LCD device of claim 14, wherein a space between the first and second hooks is less than a cross-sectional thickness of the wire.

16. The LCD device of claim 12, wherein the wire is fixable within a space between the first and second ribs by the first and second hooks.

17. The LCD device of claim 1, wherein the first rib is formed of an elastic material.

18. The LCD device of claim 17, wherein the elastic material is a plastic.

19. The LCD device of claim 1, wherein the second rib is formed of an elastic material.

20. The LCD device of claim 19, wherein the elastic material is a plastic.

21. The LCD device of claim 1, wherein the main support is formed of the same material as the guide panel.

22. The LCD device of claim 21, wherein the main support and the guide panel are formed of a plastic material.

23. The LCD device of claim 1, wherein a portion of the guide panel is arranged along an edge of the main support.

24. The LCD device of claim 1, wherein the periphery of the guide panel may define an area substantially equal to an area defined by the periphery of the main support.

25. The LCD device of claim 1, wherein the guide panel further includes a loading surface for supporting the LCD panel.

26. The LCD device of claim 1, wherein the main support is integrally formed with the first rib.

27. The LCD device of claim 1, wherein the guide panel is integrally formed with the second rib.

28. The LCD device of claim 1, further comprising a top case fixed to an upper side of the LCD panel, wherein the backlight is connected to the top case.

29. The LCD device of claim 28, wherein the top case is formed of metal.

30. The LCD device of claim 28, wherein the guide panel is supported by the main support.

31. A display device, comprising:
   a main support;
   a backlight on the main support;
   a wire connected to the backlight;
   a guide panel on the main support;
   a first rib extending from a surface of the main support including a first hook arranged at an end of the first rib;
   a second rib spaced apart from the first rib by a first distance and extending from the surface of the main support including a second hook arranged at an end of the second rib, wherein the wire is fixable within the space defined between the first and second ribs and wherein the first and second ribs are opposite to each other and wherein the first and second hooks face one another; and
   a through-hole formed within the main support, wherein the second rib extends through the through-hole.

32. The display device according to claim 31, wherein the first rib is integrally formed with the main support.

33. The display device according to claim 31, wherein the second rib is integrally formed with the guide panel.

34. The display device according to claim 31, wherein ends of the first and second hooks are spaced apart from each other by a second distance, smaller than the first distance.

35. The display device according to claim 34, wherein a thickness of the wire is greater than the second distance.

36. The display device according to claim 31, wherein adjacent portions of the first and second hooks are beveled.

37. The display device according to claim 31, wherein the first rib is formed of an elastic material.

38. The display device according to claim 31, wherein the second rib is formed of an elastic material.

* * * * *